United States Patent [19]
Baker

[11] Patent Number: 4,779,881
[45] Date of Patent: Oct. 25, 1988

[54] MOBILE VERTICAL SUPPORTING APPARATUS FOR CHILD

[75] Inventor: Mac L. Baker, Bakersfield, Calif.

[73] Assignee: Mobility Options Research Foundation, Bakersfield, Calif.

[21] Appl. No.: 96,556

[22] Filed: Sep. 14, 1987

[51] Int. Cl.[4] .......................... A61G 5/02; B62M 1/14

[52] U.S. Cl. ........................ 280/242 R; 280/242 WC; 297/DIG. 4

[58] Field of Search ... 280/242 R, 242 WC, 289 WC, 280/293; 180/907; 297/DIG. 4, DIG. 10, 5, 9

[56] References Cited

U.S. PATENT DOCUMENTS

| | | | |
|---|---|---|---|
| 2,295,006 | 9/1942 | Philips | 280/242 WC |
| 4,515,383 | 5/1985 | Minnebraker | 280/242 WC |
| 4,620,714 | 11/1986 | Davis | 280/242 R |

*Primary Examiner*—John A. Pekar
*Attorney, Agent, or Firm*—Daniel J. Meaney, Jr.

[57] ABSTRACT

A mobile vertical supporting apparatus for a child having an elongated support frame, an elongated front support leg and an elongated rear support leg is shown. The elongated support frame, front support leg and rear support leg are operatively coupled together and support an axle having two opposed wheel support ends operatively attached thereto. A foot support is operatively attached to and extends between the elongated support frame and a lower portion of the elongated rear support leg and is used to support the feet of the user. A body support section, having a central section and side support sections, is operatively attached to the elongated support frame to provide support to the upper body portion of a vertically positioned user. Left and right main wheels are attached to the opposed ends of the axle and caster wheels are operatively attached to the wheel supporting end of the elongated front support leg and to each of the opposed ends of a caster support beam for supporting the elongated rear support leg. The main wheels and the caster wheels are rotatable in response to a driving force being applied to the apparatus to transport and turn the apparatus and the user carried thereby.

11 Claims, 4 Drawing Sheets

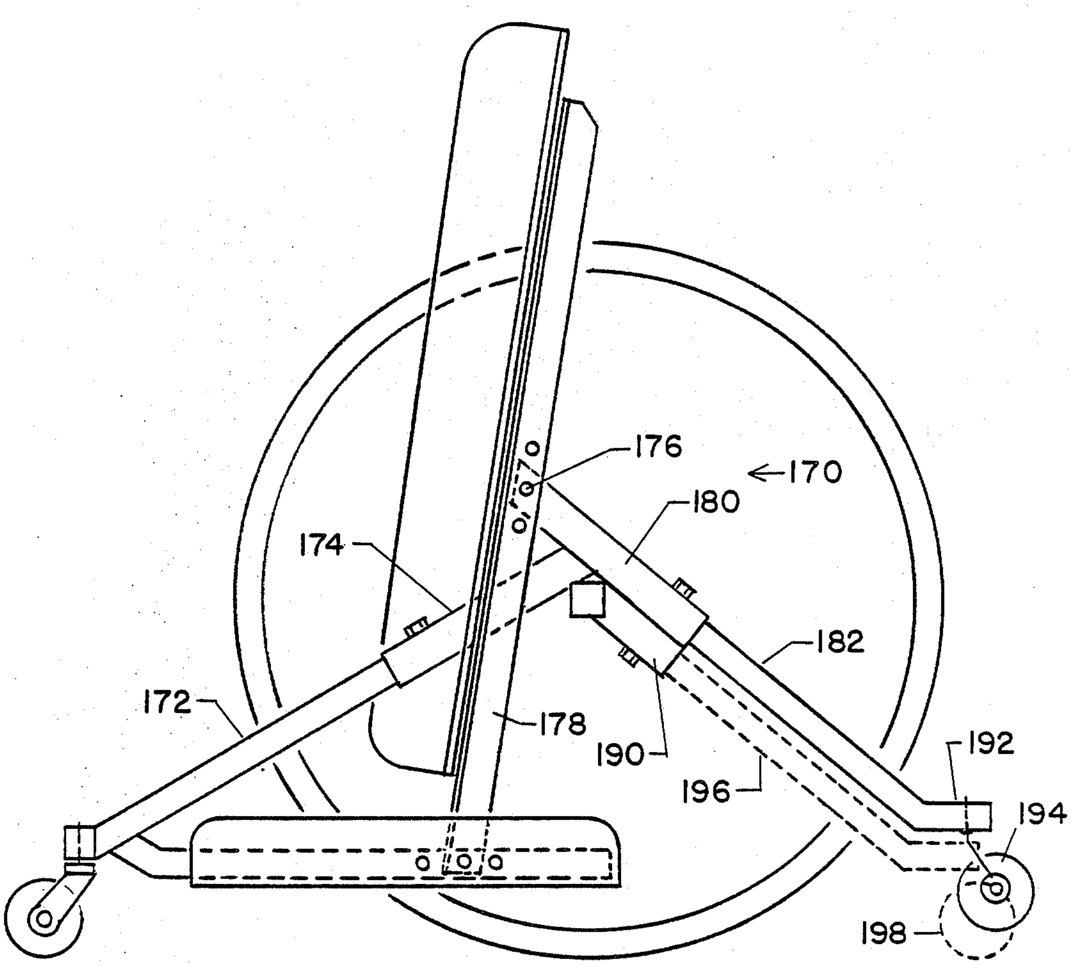
FIG. 12
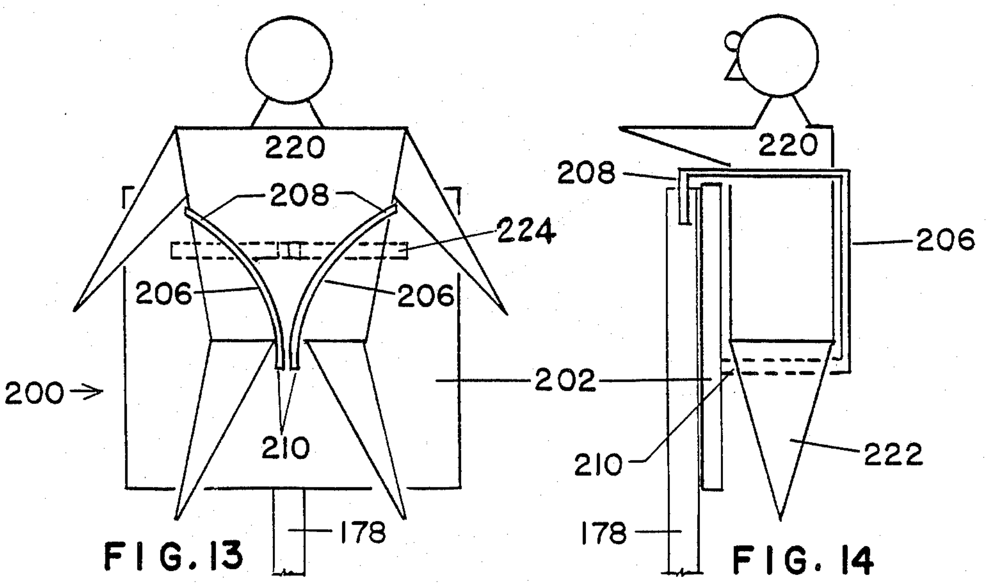
FIG. 13
FIG. 14

MOBILE VERTICAL SUPPORTING APPARATUS FOR CHILD

DESCRIPTION OF THE INVENTION

1. Field of the Invention

This invention relates to a mobile vertical supporting apparatus for a child and more specifically relates to a manually driven mobile vertical supporting apparatus for a positioning a child at a substantially vertical position against a body support member. The mobile vertical supporting apparatus, through a belting system, permits the feet of the child to engage and be supported by a foot support. The so supported child, by use of the child's hands, is in a position to be able to engage the left and right main wheels which are mounted on the apparatus at a negative camber. The top portions of the left and right main wheels are tilted or inclined towards the body of the user so as to enable the user to manually grasp the periphery of the main wheels and to apply a driving force to one of or both of the main wheels to transport and turn the mobile vertical supporting apparatus.

2. Description of the Prior Art

The general configuration of the mobile vertical supporting apparatus for a child is similar to that of the old and well-known Roman chariots. Such chariots were constructed to have a horizontal support base which had a single axle attached thereto in a position substantially normal to the direction of travel. The single axle supported left and right main wheels. A curved front shield was provided to protect the Gladiator from attack. An elongated draw tongue was provided which extended from the horizontal support and the draw tongue was operatively attached, through a harness and the like, to one or more horses which provided the driving force for the chariot.

The use of ultralight wheelchairs to provide a user with mobility is well known in the art, and U.S. Pat. No. 4,592,570 is typical of such wheelchairs. Typically, the ultralight chairs are formed of a main frame with seat mountings which permit longitudinal, tilt and height adjustments in the seat of the main frame. The ultralight wheelchairs include a left and right main wheels and a pair of caster wheels for controlling movement and turning of the wheelchair.

It is also known in the art to utilize wheelchairs that are capable of moving a user from a sitting position into a vertical or standing position. Typical of such devices is the device subject of U.S. Pat. No. 4,598,944 which discloses a wheelchair comprising a frame, wheels, a seat pivotally connected to the frame, a foot rest and a back rest. The back rest is pivotally connected to the seat, such that when a force is directed in the appropriate direction, a spring applies a force to rotate the seat, which spring acts as a counter to the weight of the user to facilitate raising the user to an erect or vertical position.

It is also known in the art to provide a mobile walker, to aid a vertical position user to walk. Typically, such a device has a pair of spaced, parallel substantially "U" shaped frames each having caster wheels affixed to the end thereof. The walker may include a seat or sling having openings therein to support a user in a sitting position. A user is placed into the mobile walker by placing the user onto the seat or by passing the legs of the user through the opening of a sling, as the case may be, permitting the feet of the user to contact the floor. The seat or sling then provides a support for the buttocks of the user. The user can then walk or propel the vehicle in a standing position, wherein the support provided by the seat or sling, and the "U" shaped members provides a protective support for the user to prevent the user from falling from the vertical position to the floor during use. A user is able to rest or secure additional support by sitting in the sling and using the sling or seat as a seating means for resting.

Other known devices are used which vertically support a person in a vertical position which include devices that hold the body of the user in a rigid or fixed position.

SUMMARY OF THE INVENTION

The present mobile vertical supporting apparatus for a child is a new, novel and unique apparatus which enables a child to be held in a standing or vertical position even though that child has no active use of any trunk or leg muscles.

In the preferred embodiment of the present invention, the mobile vertical supporting apparatus comprises a support housing having an elongated support frame, an elongated front support leg and an elongated rear support leg which are operatively coupled to each other in a substantially co-planar relationship. The support housing has a generally vertically extending upper section and, a front support leg which extends generally vertically in a direction opposite to that of the upper section and which terminates in a caster wheel support end. The support housing further includes a rear support leg which extends substantially in the same direction as the front support leg and the rear support leg is positioned at an obtuse angle relative to the front support leg. The rear support leg terminates in a caster wheel support beam having two opposed caster wheel receiving ends. An axle, having two opposed wheel support ends which are deflected vertically upward at an acute angle, is attached to the support housing. The support ends of the axle are adapted to position the left and right wheels, rotatably attached to the opposed wheel support ends, at an a negative camber relative to a vertical position. A body support means, which includes a vertically extending body support, is operatively attached to the generally vertically extending upper section. A horizontal foot support, which is located below the vertically extending body support, is operatively attached to the support housing. The vertically extending body support and the horizontal foot support are adapted to support the body of a user. The apparatus further includes means for attaching left and right main wheels to the opposed ends of the axle which position the left and right wheels at a negative camber. The caster wheel means are operatively attached to the wheel supporting end of the front support leg for supporting the front support leg and to each opposed end of the caster support beam for supporting the rear support leg. The negative camber is about 5 degrees to about 15 degrees, and, in the preferred embodiment, the negative camber is about 10 degrees.

In the known prior chariot-type apparatus, the force for transporting the chariot is provided by an outside driving force, such as for example horses. The curved front shield functions solely as a protective member, and is not used to support the body of a user in a vertical or standing position. The left and right main wheels are generally substantially perpendicular to the axle and do not have any angle of camber or angle of inclination relative to the vertical position.

In the ultralight wheelchairs, such as that disclosed in U.S. Pat. No. 4,592,570, the wheelchair is intended to be used by a user in a sitting position, and requires that the user having sufficient dexterity and muscle power to propel the vehicle by applying a moving force to the periphery of each of the left and right main wheels. In the ultralight wheelchairs, of which the device disclosed in U.S. Pat. No. 4,592,570 is typical, the left and right main wheels are in a substantially vertical position relative to the axle and do not have angle of camber or angle of inclination. Further, the ultralight wheelchairs do include means for providing sufficient support for and to enable a user to transport the chair in a vertical position.

The raising wheelchairs, of which the device disclosed in U.S. Pat. No. 4,598,944 is typical, provides a means, based upon the muscle power of the user and a spring assist, for pivoting the seat and back, relative the frame to apply an upright force to the buttocks of the user, causing the user to be moved from a sitting position to a substantially vertical standing position. In the substantially vertical position, the user is not able to reach for or engage the periphery of the left and right main wheels in order to provide a driving force to the same to render the device movable when the user is in the standing or vertical position. Actually, in the raising wheelchair devices, it is typical to include some type of locking means which is urged into a braking engagement with the substantially horizontal support surface, such for example a floor, in order to lock the wheels in position so that no movement occurs when the user is in a vertically standing position.

In the known prior art devices which hold a user in a substantially vertical position, the body and legs of a user are restricted or restrained. As such, when a body or legs of a user are restrained, then the user loses the ability to exercise the leg muscles and the like as a result of the restrained condition.

The prior art devices do not provide a means for enabling a user to be held comfortably in a standing position and do not afford the user with the ability to exercise the trunk and leg muscles. Also, the known prior art devices rely upon the muscle strength of the user and on the ability of the user to have sufficient arm length and strength to apply a moving force to the outer periphery of left and right wheels which are in a substantially generally vertical position relative to the axle, in order to transport or turn the same.

One advantage of the present invention is that the mobile vertical supporting apparatus provides a user with a means to be held in a standing position, even if the user has no active use of any trunk or leg muscles.

Another advantage of the present invention is that, as a user becomes more experienced with the mobile vertical supporting apparatus, the trunk and leg muscles can be exercised by continual contact with a horizontal support base, which provides a restoring or resistive force to the muscles, exercising the same. In addition, a user, by constant usage, such as three or four times a day, can, over a long a period of time, achieve improved bone health, improved stressing of the joints and ultimately improved bowel and bladder functions, all directly related to the user being supported in a vertical position.

Another advantage of the mobile vertically extending apparatus of the present invention is that the support frame is constructed to have a three point support system provided by a front caster wheel and two rear caster wheels and drive system comprising a left and right large main wheel, which provides the user with the capability to propel and turn the apparatus.

Another advantage of the present invention is that the axle, which supports the left and right main wheels, has the end arm sections thereof vertically deflected upward at an angle which is substantially equal to a desired negative camber for the left and right main wheels. Specifically, by having the end arms of the axle deflected in the vertically substantially upward direction at the selected acute angle, the left and right wheels, when rotatably attached to the end of the axles, have the uppermost portions thereof positioned adjacent to the central section of the body support to enable a user to reach out and engage the periphery of the left and right main wheels to move or turn the apparatus.

Another advantage of the present invention is that a belting system is provided for applying a force to the user to urge the body of the user against the body support, and an additional force is provided to lift the buttock area of the user slightly towards the body support section so that the legs of the user are free to extend to and engage the horizontal foot support.

Another advantage of the present invention is that the caster support beam which has spaced opposed caster wheel receiving ends provides a sufficient support for the horizontal foot support section to support the weight of the user if the entire weight of the user is placed thereon. The front wheel caster and the pair of rear wheel casters make it quite easy for the user to cause the mobile vertically supporting apparatus to have a relatively short turning radius.

Another advantage of the present invention is that the outer periphery of each of the left and front wheels can be formed to have a resilient support means which may be in the form of a pneumatic tube or in the form of a solid, resilient tire. This provides a good coefficient of friction between the main wheels and the floor and between the main wheels and hands of the user to make it easier to propel or turn the apparatus.

Another advantage of the present invention is that the legs of a user, when being supported in a vertical position, permit the body and motor functions of the user to be developed. Specifically, if a child's motor functions or body are sufficiently developed or capable of being developed, that child can learn to use the device for exercising body muscles thereby maximizing the advantage of this device for such handicapped child.

BRIEF DESCRIPTION OF THE DRAWING

These and other advantages of this invention will be readily apparent when considered in light of the detailed description hereinafter of the preferred embodiment and when considered in light of the drawing set forth herein which includes the following figures:

FIG. 12 is a diagrammatic representation of an alternate embodiment for the mobile vertical apparatus wherein the elongated rear support leg can be inserted into another support member in a frame to raise and rotate the housing which changes the camber of the device;

FIG. 13 is a pictorial representation of an alternate embodiment of a belting system wherein the belts extends between the legs and then under the arms of a user; and FIG. 14 is a pictorial representation of a partial side elevational view of a user being held in a vertical position by the belting system of FIG. 13.

DESCRIPTION OF THE PREFERRED EMBODIMENT

FIGS. 1, 2, 3 and 4 show the mobile vertical supporting apparatus for a child, which apparatus is shown generally by arrow 20. The mobile vertical supporting apparatus 20 has a support housing having the general components designated by arrows 22 in FIG. 1.

Figure 1:
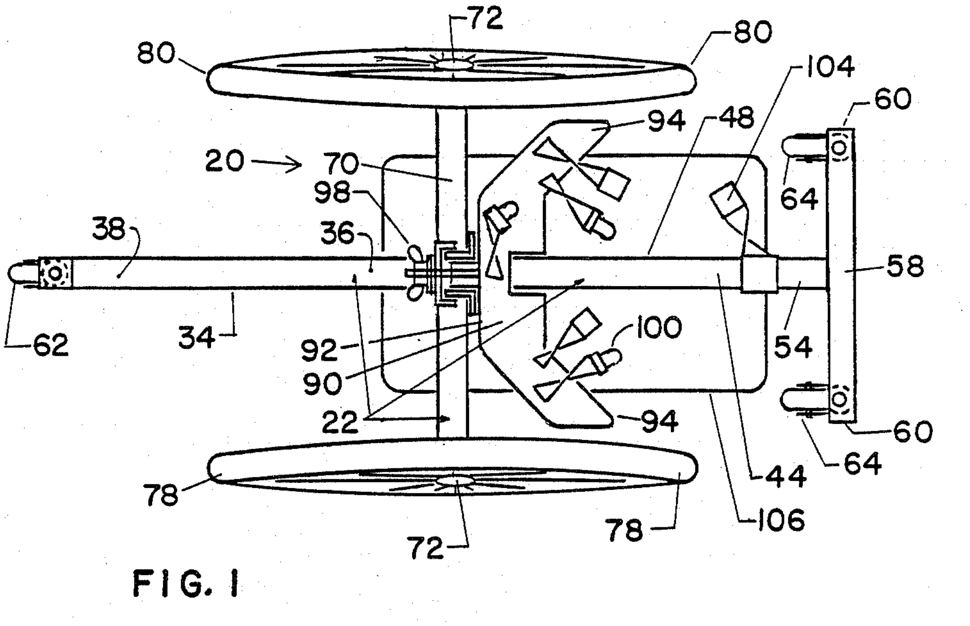
FIG. 1 is a top plan view of the mobile vertical supporting apparatus showing the left and right main wheels at an a negative camber.
Figure 2:
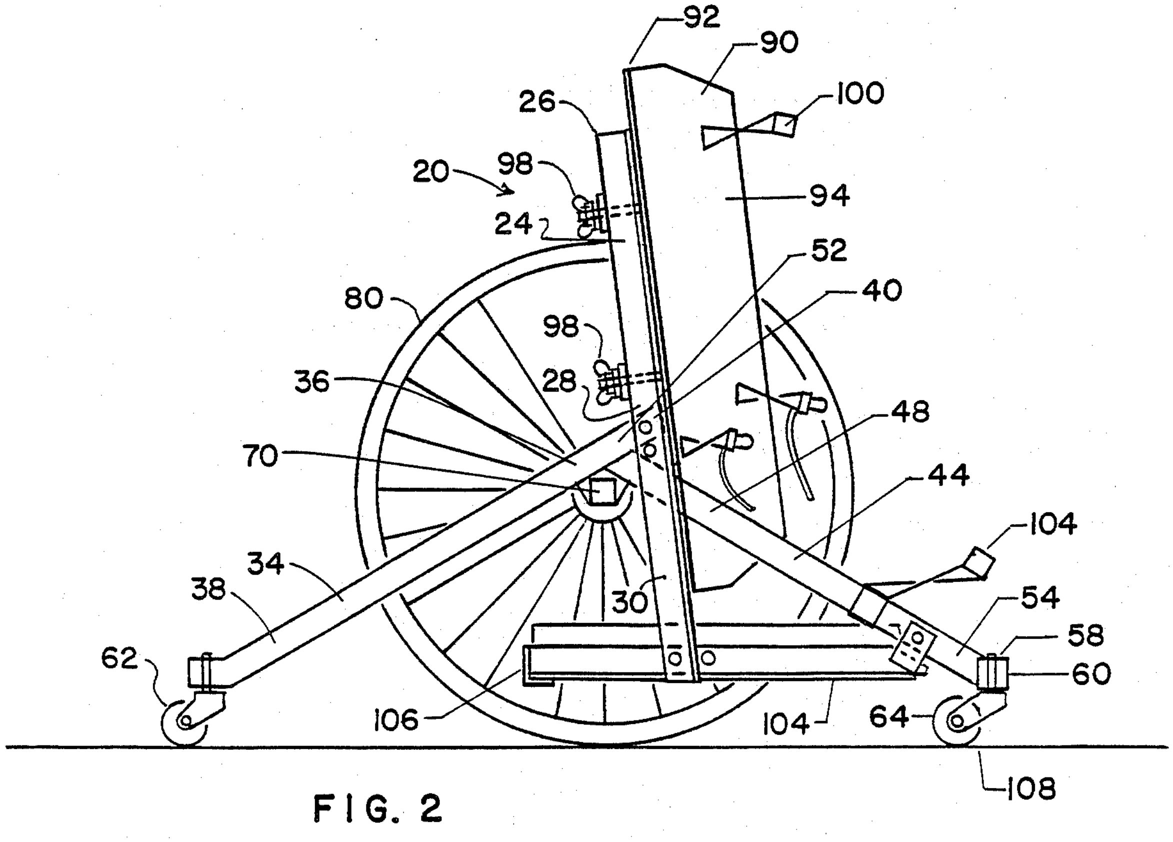
FIG. 2 is a sectional, elevational view of the mobile vertical supporting apparatus of FIG. 1.

The support housing 22 includes an elongated support frame, shown generally as 24 in FIG. 2, which has an upper support section 26, a central support section 28 and a lower support section 30. The elongated support frame 24 is adapted to be in a substantially vertically position relative to the horizontal plane of the floor 108 supporting the apparatus as shown in FIG. 2. The elongated support frame is a slight forward tilt to establish a slight offset so that the body of the user is able to be urged thereagainst and as will be described hereinbelow.

The support housing includes the elongated front support leg, shown generally as 34, which has an upper bracing section 36 located at one end thereof and wheel support end 38 located at the opposite end thereof. The elongated front support leg 34 is co-planar with the elongated support frame 24 and the upper support section 26 of the elongated support frame 24 extends in a first direction from the elongated front support leg 34 and the lower support section 30 of the elongated support frame 24 extends in a second or opposite direction therefrom.

The third element which comprises of the housing support is the elongated rear support leg shown generally as 44. The elongated rear support leg 44 has an upper mounting section 48 at one end thereof and has at the other end thereof a bracing end 54 which terminates in a substantially perpendicular caster support beam 58. The caster support beam 58 has two spaced opposed ends 60 which are adapted to receive end support caster wheel support means including caster wheels 64 as will be described hereinbelow. The upper mounting section 48 of the elongated rear support leg 44 is operatively coupled to the buttress support end 40 of the front end elongated support leg 34 at a location slightly displaced from and at an acute angle relative to and from the buttress support end 40 of the elongated front support leg 34. The elongated rear support leg 44 is in the plane defined by the elongated support frame 24, the elongated front support leg 34, and the elongated rear support leg 44 to position the caster support beam 58 in a substantially normal position relative to the co-planar elongated support frame 24, the elongated front support leg 34, and the elongated rear support leg 44, all as described hereinbefore. At the junction where the upper mounting section 48 is operatively attached to the upper bracing section 36 of the elongated front support leg, an obtuse angle is formed therebetween resulting in both of the front support leg 38 and the rear support leg 54 being co-planar with each other and with both legs 38 and 54 extending vertically downward toward the horizontal support 108 which is in a direction opposite to that of the generally vertically upwardly extending upper support section 26 of the elongated support frame 24.

An axle, shown generally as 70, has two opposed spaced wheel support ends, shown generally as 72. The axle 70 is operatively attached to and supported by the upper bracing section 36 of the elongated front support leg 34 and the upper mounting section 48 of the elongated rear support leg 44. The axle is supported in a substantially normal position relative to the co-planar elongated support frame 24, elongated front support leg 34 and the elongated rear support leg 44. The axle 70 is in a spaced coplanar relationship with and substantially parallel to the the caster support beam 58.

A foot support 104 is operatively attached to and extends between the lower support section 30 of the elongated support frame 24 and the bracing end 54 of the elongated rear support leg 44 located adjacent to the caster support beam 58.

Figure 10:
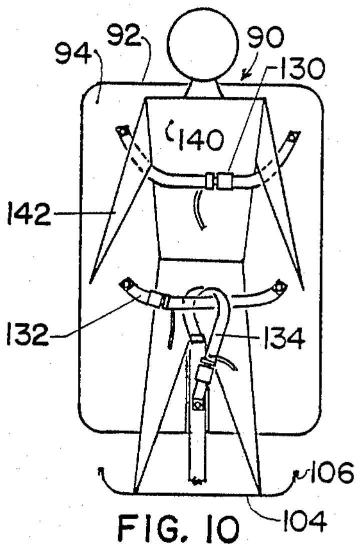
FIG. 10 is a pictorial representation of the belting system of FIG. 9 showing a user being held in a vertical standing position against the body support and wherein the belting system provides a seating means for causing the legs to have the ability of selectively engaging the horizontal floor support.

A body support section, shown generally as 90, has a central support section 92 and side support sections shown as 94. The central support section 92 and the side support sections 94 define a support zone for supporting an upper body portion of a vertically positioned user as illustrated in FIG. 10. The user, when held in a vertical position, has the user's feet positioned on and supported by a horizontal foot support 104. The horizontal foot support 104 has a periphery extending therearound which can be generally referred to as a curved upwardly extending edge shown generally as 106. The horizontal foot support 104 supports the feet of the user, and concurrently permits the user to exercise the trunk and leg muscles by pushing against the horizontal foot support 104.

The body support is operatively attached through an attaching means, shown generally as 98, to the upper support section 26 of the elongated support frame 24 to permit adjustment of the body support 90 relative to the elongated support frame 24 to permit the body support to be positioned in a plurality of different longitudinal locations and heights relative to the elongated support frame 24. This permits adjustment of the apparatus to accommodate children of various sizes and, can be positioned such that a child of a sufficient size, having sufficiently long arms can reach out and engage the periphery of the left and right main wheels attached to the axles as described hereinafter. This is further discussed in connection with FIGS. 7 and 8.

Figure 5:
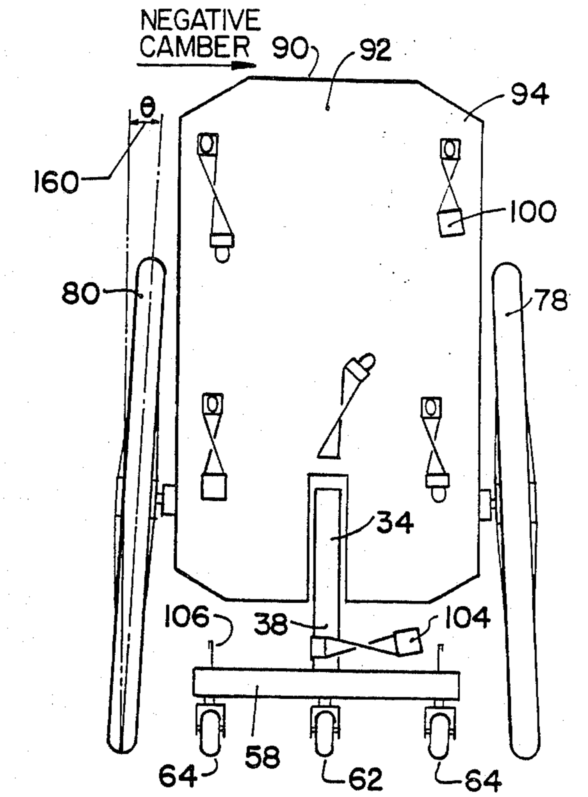
FIG. 5 is a left elevational view of the mobile vertical supporting apparatus of FIG. 1 showing the belting arrangement and the main wheels at a negative camber.

Means, generally in the form of shaft 154 and a hub 156 having a bearing means as will be described in connection with FIG. 11 hereof, are provided for attaching left and right main wheels 78 and 80, respectively, to the opposed spaced ends 72 of the axle 70 to render the apparatus moveable. The left and right main wheels 78 and 80 are positioned so as to be canted to have a selected angle of inclination. As is known in the art, a wheel in the position of being essentially vertical relative to the horizontal support has a zero camber. If the displacement of the top of the wheel is outward, this is called an "negative camber" and this is depicted in FIG. 5 by the arrow labeled "Camber". When the top of the wheels are inclined inwardly toward the body support 90. This is generally referred to as an "negative camber", and is angle is that measured relative to a point where the wheel contacts a horizontal surface, all as illustrated in FIG. 5.

Caster wheel means, such as for example caster wheel 62, is operatively attached to the wheel supporting end 38 of the elongated front support leg 34 for supporting the elongated front leg 34. Also, caster wheel means, including caster wheels 64, are attached to each of the opposed ends 60 of the caster support beam 58 for supporting the elongated rear support leg 54. Also, when a child places a loading on the horizontal foot support 104, the casters 64 likewise principally accommodates that loading force.

Figure 3:
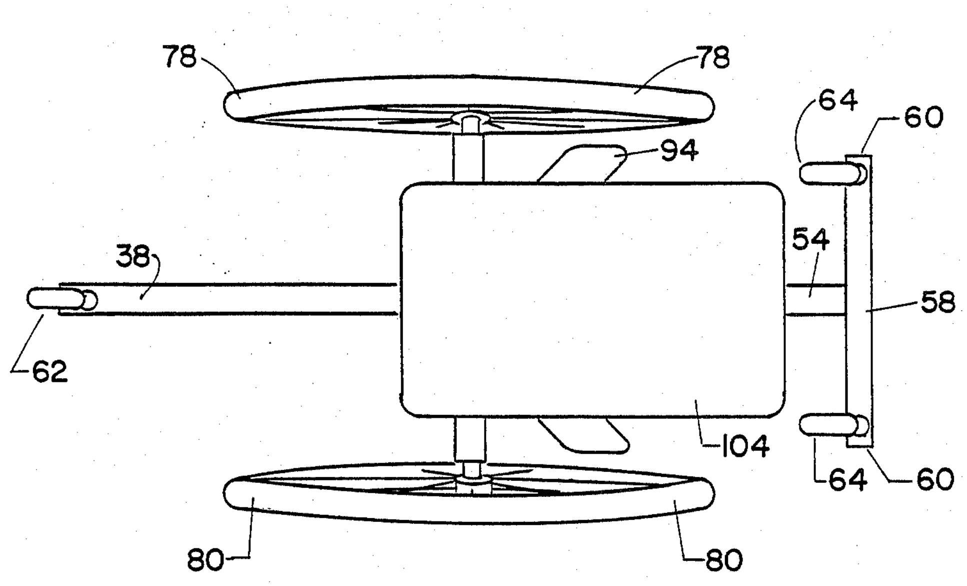
FIG. 3 is the bottom plan view of the mobile vertical supporting apparatus of FIG. 1.
Figure 4:
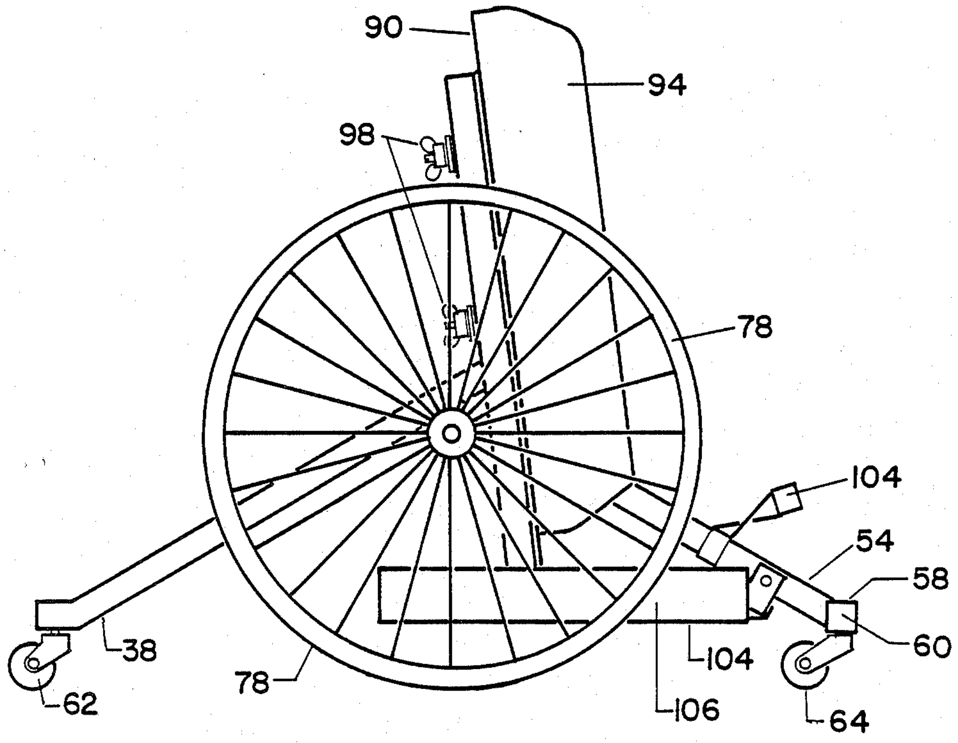
FIG. 4 is a rear elevational view of the mobile vertical supporting apparatus of FIG. 1.

The left and right main wheels 78 and 80 and the caster wheels 62 and 64 are rotatable in response to a driving force being applied thereto to transport and turn the apparatus and the user carried thereby. The driving force can either be the hands of a user being placed on the periphery of the wheels 78 and 80 in applying a force in the direction of movement. In the alternative, force can be applied to one of the two main wheels to cause the apparatus to be turned about the casters 60 and 64. FIGS. 3 and 4 show the relationship between the various components and specifically the position between the left and right main wheels and the caster support wheels.

Figure 6:
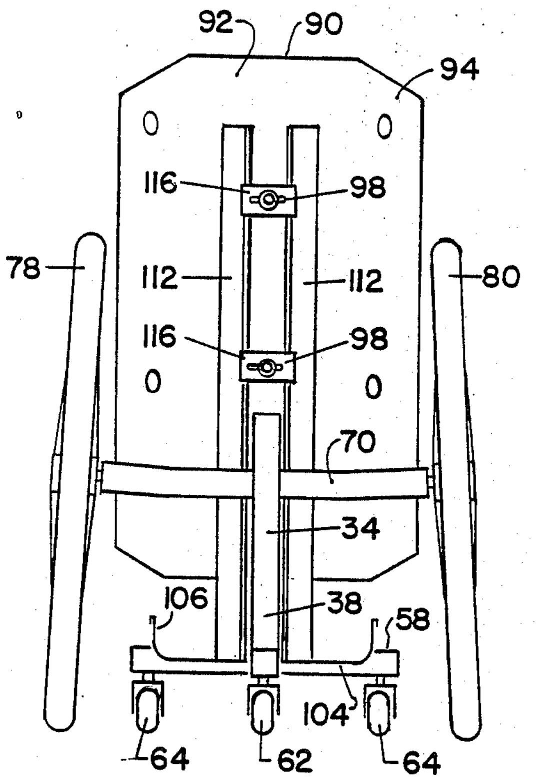
FIG. 6 is a right elevational view of the mobile vertical supporting apparatus of FIG. 1.

FIGS. 5 and 6 show the relationship between the left and right main wheels 78 and 80, respectively, and the fact that the same are at an acute angle relative to the body support 90 to enable a user to engage the upper portion of the wheels, which are directed towards the body support, in order to apply a driving force to one or both of the wheels 78 and 80.

Figure 7:
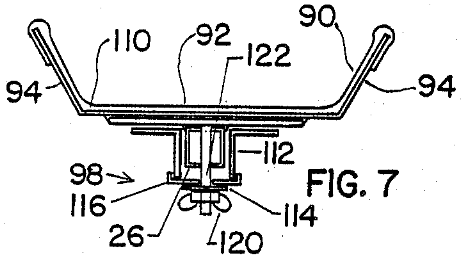
FIG. 7 is a partial pictorial view of the body support showing the central support section and the side wall section having resilient means affixed thereto.
Figure 8:
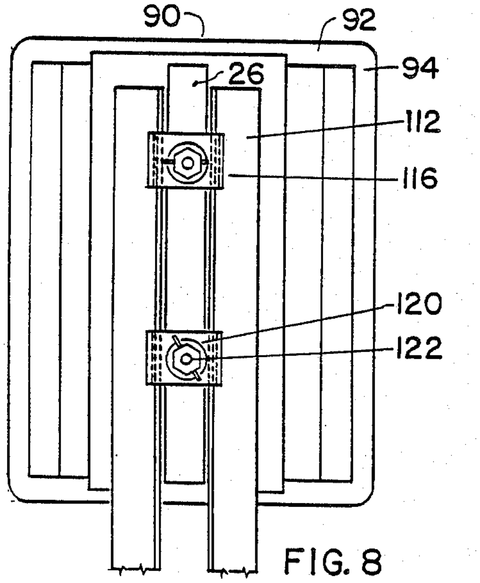
FIG. 8 is a partial front elevational view of the body support of FIG. 7 showing the means for attaching the body support to the elongated front support leg in a plurality of different longitudinal locations and heights relative to the elongated support frame.

FIGS. 7 and 8 depict one embodiment of the body su ort 90 including the central support section 92 and the side wall section 94 having a resilient coating 110 applied thereto. Also, the means for attaching the body support 98 to the elongated support frame 26 is likewise illustrated in FIGS. 7 and 8. Specifically, the attachment means includes a pair of spaced parallel angle members shown as generally as 112, which have a width slightly greater than the upper support section 26 of the elongated support frame 24. There are two separate adjusting means 98 as depicted in FIG. 8, which are spaced relative to each other, but which utilize similar components.

Referring to FIGS. 7 and 8, a force member 116 has an outer lip which rides over the edges of the angle members 112 to provide a clamping means for holding the body support 90 rigidly against the upper support section 26 of the elongated support frame 24. A thumbnut 120, is threaded about a threaded member 122 to provide the clamping force for positioning the body support 90 at a desired position on the upper support section 26.

Figure 9:
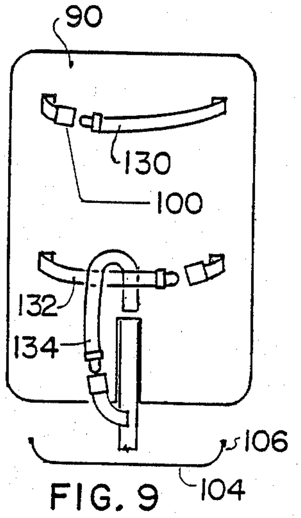
FIG. 9 is a pictorial representation of the belting arrangement as viewed from the side of the central support section of the body support which is adapted to support the upper body portion of the torso of a user.

FIGS. 9 and 10 depict pictorially the belting system 100 having an upper belt 130, a lower belt 132, and a buttocks belt 134. As depicted in FIG. 10, a child, shown generally as 140, who would be the principal user of the apparatus of the present invention, is positioned in the device such that the upper torso of the body is urged primarily against the central support section 92 of the body support 90 and the upper belt 130 is positioned around the upper torso under the arms to pull the user 140 forward so that the upper torso engages in and is supported by the resilient central section 92 and the resilient side wall sections 94. A horizontal lower belt 132 is attached around the buttocks area to provide an upward force to the buttocks to maintain the user in a standing postion. A vertical lower belt 134 is passed between the legs to provide a sling under the legs which provides an upward support in the form of a strap-like seat member which applies an upward force to the buttocks to maintaim the child in a standing position. The combination of belts 132 and 134 are adjusted with sufficient tightness or tension so that the legs and the feet of a user are placed in an appropriate distance from the horizontal foot support so that the user can press against the horizontal foot support 104, while being supported by belts 132 and 134, to exercise the trunk and leg muscles.

Figure 11:
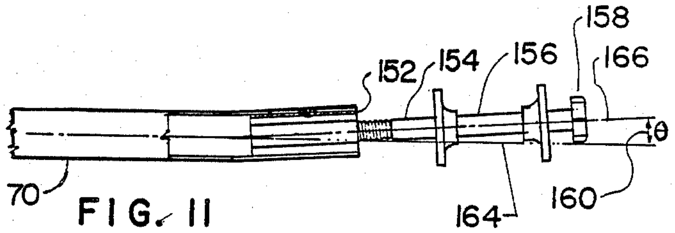
FIG. 11 is a partial pictorial representation of one of the end arms of an axle showing the arms at an acute angle and a bearing means for supporting a main wheel.

FIG. 11 illustrates pictorially one of the support ends of the axle 70, that support end being shown generally as end 150. End 150 includes a threaded member 152 which is operatively attached thereto, which is adapted to receive a threaded shaft 154. The threaded shaft 154 includes a wheel hub 156 mounted on a bearing, and an end nut 158 to hold the wheel rotatably to the end of the axle. The axle 70 has its center line shown by dashed line 164. The angle of deflection of the end 150 is shown by dashed line 166. The angle between dashed lines 164 and 166, referred to herein as an acute angle, is shown generally by the angle theta on the drawing. The angle theta or the angle of deflection, is exactly equal to the negative camber shown as FIG. 5 and shown generally as theta and identified by arrow 160.

FIG. 12 illustrates an alternate embodiment for the structure of a housing 170. The housing 170 includes a tubular frame member 174 that receives an elongated front support leg 172. The elongated support frame 178 is attached to tubular member 174.

A rear tubular support member 180 has a second or lower rear tubular support member 190 affixed thereto, each of which are adapted to receive and support the elongated rear support leg 182. When the elongated rear support leg 182 is removed from the support member 180, and placed into the lower support member 190, the position of the elongated rear support leg is showed by dashed lines 196. The effect of placing the elongated rear support leg 182 into the lower support member 190 is to raise and rotate the housing frame relative to the main wheels (not shown). This effectively changes the camber of the main wheels, which, in turn, changes the negative camber. The practical effect of such a change is as follows. Rather than applying equal driving forces concurrently to both main wheels, a child could apply a driving force to only one of the two main wheels, which sometimes occurs due to the physical condition of the user. With the negative camber, the device will still move ahead in a relatively straight path in a forward direction. However, if the direction of movement is rearward, the device will not go along a straight path.

A child can learn to apply an appropriate force to the main wheels to cause the device to be propelled in a forward direction.

FIGS. 13 and 14 disclose an alternate belting sytem for holding the user in a vertical position as illustrated in FIGS. 13 and 14. The body support 200 has a pair of belts 206 which has one end thereof, end 210, affixed to the lower center section of the body support and that the belt passes between the legs 222 of the user 220 and around the buttocks area (FIG. 14). The belts 206 are then attacheds to a buckle 208, which, in time, is connected to the housing. The belting system applies an uplifting force to the body permitting the legs 222 to be unrestrained and freely able to move. This permits a user to exercise the legs with the attended advantages thereof as described herein.

The mobile vertical extending apparatus of the present invention is designed to support a child in a vertical standing position even if that child or user has no active use of any trunk or leg muscles. The utility of the invention resides in the user or child becoming familiar with the device, and, when the user does become familar with the device and commences using the same several times a day, the user begins to push against the horizontal foot support with its legs, which then start to exercise and develop the trunk and the leg muscles. As a result of those exercises and activities, the user then can experience improved bone health, improved joint stressing and improved bowel and bladder use, as well as improved trunk and leg muscles. Also, depending on the mental capability and physical strength of the user, the mobile vertical standing apparatus also gives the user the option of developing the ability to place the user's hands on the periphery of the uppermost end of the left and right main wheels, and to apply a driving force thereto or turning force thereto in order to propel the device with the user standing vertically thereon. This would improve the hand, arm and shoulder muscles of a user.

As illustrated herein, the left and right main wheels have a relatively large frame and relatively thin resilient members mounted thereon. Typical of the structure of the left and right main wheel are wheels in size and structure which are about the size of a bicycle wheel. The periphery of each of the left and right main wheels may have a resilient tire mounted thereon in order to provide a frictional gripping between the device and the floor, and the wheel and hands of a user. Also, a resilient tire mounted around the periphery of the left and right main wheels provides a frictional gripping surface for the user to apply a driving or turning force to one or both of the wheels in order to propel or turn the apparatus. The resilient tire may be a pneumatic type tire, as is well known in the bicycle art, or could be formed of a solid resilient material which is likewise is known for such applications as wagon wheels, carriage wheels, and the like.

The negative camber preferably, would be in the range of about 5 degrees to about 15 degrees. However, in the preferred embodiment, it has been found that negative camber of about 10 degrees is preferred in order to deflect the uppermost portion of the left and right main wheels such that the edges thereof are sufficiently close to the body support so that a user can easily extend the user's arm to enable the hands thereof to engage the periphery of the main wheel to provide the propelling and turning force as described hereinbefore.

Although the preferred embodiment of this apparatus is directed principally toward children who have minimal muscle use or muscle coordination, it is invisioned that this apparatus could be utilized for older children or adults who have the physical strength and ability to stand in a vertical position and to apply a driving force to the periphery of the large main wheels so as to propel or turn the device. In the alternative, a belting system could be replaced with some type of a sling or seating support system, which would accomplish substantially the same function. The use of the belting system on the upper torso of the body is found to be advantageous because a positive force is applied to the upper torso of the body such that the body maintains contact against the central support section and side wall sections of the body support.

Also, by inclining the elongated frame member at a slightly forward angle or rake, the center of gravity of the user is shifted slightly forward, which provides the user with a bearing surface upon which the force can be applied or reacted in response to the user applying a driving or turning force to the left and right main wheels.

What is claimed is:

1. A mobile vertical supporting apparatus for child comprising an elongated support frame having an upper support section, a central support section and a lower support section;

an elongated front support leg having an upper bracing section located at one end thereof and a wheel support end located at the opposite end thereof, said upper bracing section having a buttress support end which is operatively attached to the central section of said elongated support frame such that said elongated front support leg is coplaner with said elongated support frame and wherein the upper support section of said elongated support frame extends in a first direction from the elongated front support leg and the lower support section of said elongated support frame extends in an opposite direction therefrom;

an elongated rear support leg having an upper mounting section at one end thereof and having at the other end thereof a bracing end which terminates in a substantially perpendicular caster support beam having two spaced opposed ends, said upper mounting section being operatively coupled to the buttress support end of said front elongated support leg at a location slightly displaced from and at an acute angle from the buttress support end of said elongated front support leg such that said elongated rear support leg is in the plane defined by said elongated support frame, said elongated front support leg and said elongated rear support leg to position the caster support beam in a substantially normal position relative to the coplaner elongated support frame, said elongated front support leg and said elongated rear support leg;

an axle having two opposed spaced wheel support ends which are deflected at an acute angle to the elongated axis of the axle, said axle being operatively attached to and supported by the upper bracing section of said elongated front support leg and the upper mounting section of said elongated rear support leg, said axle being supported in a substantially normal position relative to the coplaner elongated support frame, elongated front support leg and elongated rear support leg, said axle and deflected support end thereof being in a spaced coplaner relationship with and substantially parallel to said caster support beam;

a foot support operatively attached to and extending between the lower support section of said elongated support frame and the bracing end of said elongated rear support leg located adjacent to the caster support beam;

a body support having a central section and side support sections, said central section and said side support sections define a support zone for supporting an upper body portion of a vertically positioned user wherein the user's feet are positioned on and supported by said foot support, said body support having its central section operatively coupled to and supported in a substantially vertical position by the upper support section of said elongated support frame to support a user in a substantially vertical position;

means for attaching left and right main wheels to the opposed spaced ends of said axle to render the apparstus movable; and caster wheel means operatively attached to said wheel support end of said elongated front support leg for supporting the elongated front support leg and to each opposed end of said caster support beam for supporting the elongated rear support leg;

said main wheels and said caster wheel means being rotatable in response to a driving force being applied thereto to transport and turn said apparatus and a user carried thereby.

2. The mobile vertical supporting apparatus of claim 1 wherein said attaching means includes bearing means operatively coupled said deflected wheel support ends for mounting said left and right main wheels to said axle.

3. The mobile vertical supporting apparatus of claim 2 further comprising means for attaching said body support to said elongated support frame in a plurality of different longitudinal locations and heights relative to the elongated support frame.

4. The mobile vertical supporting apparatus of claim 1 further comprising belting means for supporting the body of a user against the body support and for urging the body slightly upward to enable the feet of a user to be positioned to engage the front support.

5. The mobile vertical supporting apparatus of claim 4 further comprising cushion means located on the central sections and side support sections of the body support to provide a resilient support for the body of the user.

6. The mobile vertical supporting apparatus of claim 1 wherein said foot support comprise a generally planar support base having an outer periphery and upwardly supporting side walls extending substantially perpendicular from the outer periphery of said generally planar support base.

7. The mobile vertical support apparatus of claim 1 wherein the periphery of each of the left and right main wheels have a resilient tire mounted therearound.

8. The mobile vertical supporting apparatus of claim 7 wherein each of said tires is formed of a solid resilient material.

9. The mobile vertical supporting apparatus of claim 1 wherein the acute angle is selected to position the main wheels at a negative camber of about 5 degrees to about 15 degrees.

10. The mobile vertical supporting apparatus of claim 9 wherein the acute angle is selected to position the main whells at a negative camber of about 10 degrees.

11. The mobile vertical supporting apparatus of claim 1 wherein the elongated support frame includes a support means for changing the position of the elongated rear support leg to raise and rotate the support housing relative to the axle to change the angle of negative camber of the device.

* * * * *